June 10, 1924.
T. G. HOWELLS
PIPE SUPPORT FOR VEHICLES
Filed March 12, 1923
1,497,564
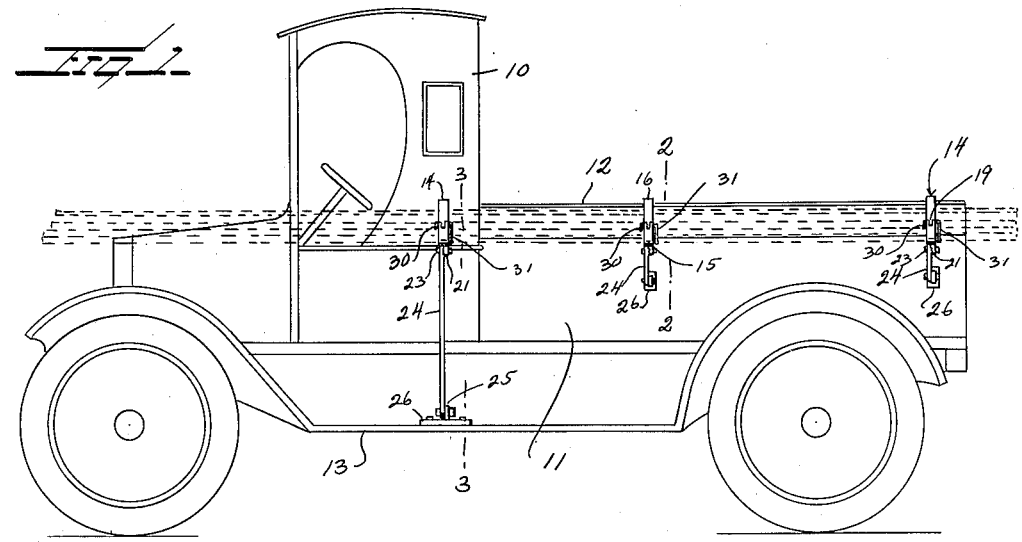
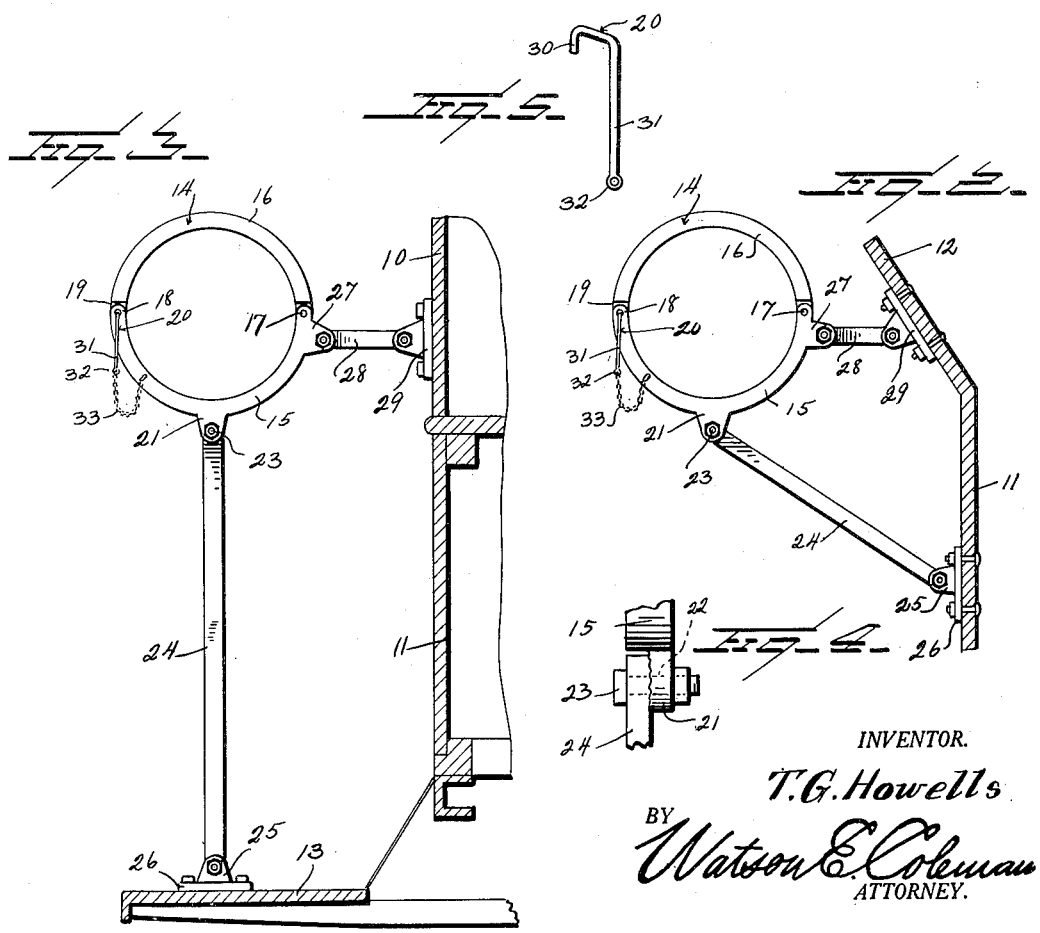
INVENTOR.
T. G. Howells
BY Watson E. Coleman
ATTORNEY.

Patented June 10, 1924.

1,497,564

UNITED STATES PATENT OFFICE.

THOMAS G. HOWELLS, OF GIRARD, OHIO.

PIPE SUPPORT FOR VEHICLES.

Application filed March 12, 1923. Serial No. 624,570.

*To all whom it may concern:*

Be it known that I, THOMAS G. HOWELLS, a citizen of the United States, residing at Girard, in the county of Trumbull and State of Ohio, have invented certain new and useful Improvements in Pipe Supports for Vehicles, of which the following is a specification, reference being had to the accompanying drawings.

This invention relates to pipe supports for vehicles and more particularly to a device adapted for attachment to automobile trucks for supporting pipes and the like for transportation.

An important object of the invention is to provide a device of this character which is so constructed that it is readily applicable to the outer surface of the body of the vehicle and which when so applied will maintain in position pipes or other elongated bodies for transportation.

A further object of the invention is to provide a device of this character so constructed that the pipes may be removed transversely therefrom, thereby permitting the use of the holder when the truck is placed in close quarters where longitudinal withdrawal of the supported elements is rendered difficult.

These and other objects I attain by the construction and arrangement shown in the accompanying drawings wherein for the purpose of illustration is shown a preferred embodiment of my invention and wherein like reference characters designate like parts throughout.

In the drawings:—

Figure 1 is a side elevation of a truck showing pipe holders constructed in accordance with my invention applied thereto;

Figure 2 is a section on the line 22 of Figure 1;

Figure 3 is a section on the line 3—3 of Figure 1;

Figure 4 is an enlarged view showing the engagement between the ears and links; and Figure 5 is a detailed perspective of the securing element employed.

Referring now more particularly to the drawings, the numeral 10 indicates the body or cab of a motor truck, 11 the truck body, 12 the flare board at the upper surface of the sides of the body, and 13 the running board of the vehicle. In accordance with my invention I provide holders 14 which comprise a ring formed in two sections 15 and 16, connected at one edge by a pivot joint 17 and at the opposite end by a joint having interlocking ears 18 and 19 carried by the sections 15 and 16 respectively and provided with an opening through which a securing element 20 may be extended.

The section 14, or bottom section, is provided centrally upon its outer surface with a lug 21 having an opening 22 for the reception of a securing element 23, the surface of the lug about the opening being readily scored so as to permit the securing element 23 to securely clamp in position a supporting arm 24. The lower end of the supporting arm 24 which is of the desired length is engaged with a lug 25 similar to the lug 21 and formed upon an attaching plate 26 adapted for engagement either with the side wall of the cab or truck body or with the running board 13.

Adjacent the pivot 17 of the sections 15 and 16, the section 15 has a second lug 27 similar to the lugs 21 and 25 and with which is engaged a second supporting arm 28, the free end of which engages the lug of a securing plate 29 similar to the securing plate 26 and which securing plate 29 is adapted for attachment either to the flare board 12 or the body 10 as may be desired. It will be obvious that by properly proportioning the arms 24 and 28 the section 15 may be so secured to the truck that it is directed upwardly or that its inner supporting face has the ends thereof in approximate horizontal alignment. A plurality of the supports 14 may be distributed along the length of the truck in horizontal alignment and combined to receive pipes or the like and support the same at a plurality of points. It will furthermore be obvious that pipes greater in length than the length of the truck body may be thus readily supported and may be readily removed by the removal of the securing elements 20 and throwing back the sections 16 so as to expose the supported articles. In order that the securing elements 20 may not become accidentally released during movement of the vehicle and at the same time may be readily removed when so desired these are formed of material of less diameter than the openings 22 and having at one end an angular portion or tip 30. At the opposite end a right angular extension 31 is provided, disposed in the same plane as the angular tip 30 and having at its end an eye 32 with which is engaged one end of a chain 33, the opposite end of which is secured to the section 15. The length of the chain and right angular extension 31 will tend to maintain this extension in a vertical position and accordingly the tip 30 will form a retaining surface preventing accidental withdrawal of the hook.

From the foregoing it is believed to be obvious that a support constructed in accordance with my invention is particularly well adapted for use for supporting pipes and similar articles upon trucks for the reason that it permits the ready removal thereof and enables the transportation of pipes of greater length than the truck body would accommodate. It will furthermore be obvious that the same is capable of some change and modification without materially departing from the spirit of my invention. I accordingly do not limit myself to such specific structure except as hereinafter claimed.

What is claimed is:—

1. In a pipe holder for trucks, a pair of substantially semi-circular sections pivoted together at one end and provided at their free ends with inter-engaging portions adapted for the reception of a securing element, one of said sections being provided with a pair of ears, supporting arms engaged with said ears, and attaching plates adjustably engaged with the free ends of the arms and adapted for engagement with the outer surface of the truck body.

2. In a pipe holder for trucks, a pair of substantially semi-circular sections pivoted together at one end and provided at their free ends with inter-engaging portions, having openings aligned when the sections are in close relation for the reception of a securing element, one of said sections having formed thereon a pair of ears, links pivotally connected to said ears and attaching plates having ears pivotally connected with the free ends of the links and adapted for attachment to the outer surface of the truck body.

In testimony whereof I hereunto affix my signature.

THOMAS G. HOWELLS.